United States Patent

Puchalla et al.

Patent Number: 5,346,040
Date of Patent: Sep. 13, 1994

[54] ONE-PIECE TRANSMISSION BAND

[75] Inventors: Christopher P. Puchalla, Lombard; Anthony J. Grzesiak, Sauk Village; Douglas J. Slager, Oak Park, all of Ill.

[73] Assignee: Borg-Warner Automotive Transmission & Engine Components Corporation, Sterling Heights, Mich.

[21] Appl. No.: 126,055

[22] Filed: Sep. 23, 1993

Related U.S. Application Data

[63] Continuation of Ser. No. 723,429, Jun. 28, 1991, abandoned, which is a continuation-in-part of Ser. No. 508,864, Apr. 12, 1990, abandoned, and Ser. No. 546,161, Jun. 28, 1990, Pat. No. 5,078,237.

[51] Int. Cl.$^5$ .............................................. F16D 49/08
[52] U.S. Cl. .................................. 188/77 W; 188/259; 192/107 T
[58] Field of Search .............. 188/77 W, 77 R, 249, 188/250 H, 259; 72/379.2, 379.6; 192/80, 107 T

[56] References Cited

U.S. PATENT DOCUMENTS

| 257,733 | 5/1882 | Massey | 188/77 R |
|---|---|---|---|
| 774,448 | 11/1904 | Norris . | |
| 1,003,621 | 9/1911 | Lincoln . | |
| 1,580,270 | 4/1926 | Williams | 188/77 W |
| 1,590,104 | 6/1926 | Manning . | |
| 1,653,277 | 12/1927 | Hart | 188/77 R |
| 1,720,765 | 7/1929 | Smith . | |
| 1,950,260 | 3/1934 | Nelson | 188/249 |
| 2,136,111 | 11/1938 | Laurent | 188/77 R |
| 2,690,239 | 9/1954 | Candee | 188/77 R |
| 2,692,663 | 10/1954 | Reed et al. | 188/259 |
| 2,857,162 | 10/1958 | Zuercher | 273/47 |
| 2,975,870 | 3/1961 | Vosler et al. | 188/77 W |
| 3,367,466 | 2/1968 | Lang | 192/107 |
| 3,386,535 | 6/1968 | Bishop et al. | 188/77 R |
| 3,399,749 | 9/1968 | Baule | 188/259 |
| 3,483,955 | 12/1969 | Schell et al. | 192/41 |
| 3,670,392 | 6/1972 | Haas | 188/259 |
| 3,732,954 | 5/1973 | Heid | 188/259 |
| 3,811,542 | 5/1974 | Hamrick et al. | 188/259 |
| 3,841,447 | 10/1974 | Schlapmann et al. | 188/77 R |
| 4,053,032 | 10/1977 | McDonald | 188/77 R |
| 4,157,746 | 6/1979 | Body | 188/77 R |
| 4,159,049 | 6/1979 | Merz | 188/259 |
| 4,456,100 | 6/1984 | Manaki | 188/77 R |
| 4,585,098 | 4/1986 | Pike | 188/251 A |
| 4,602,706 | 7/1986 | Blinks et al. | 188/250 H |
| 4,611,381 | 9/1986 | La Barge et al. | 29/432 |
| 4,757,880 | 7/1988 | Grzesiak | 188/77 W |
| 4,787,483 | 11/1988 | Stefanutti | 188/77 W |

FOREIGN PATENT DOCUMENTS

| 1248884 | 9/1985 | Canada | 188/174 |
|---|---|---|---|
| 1253965 | 11/1967 | Fed. Rep. of Germany . | |
| 2340446 | 2/1974 | Fed. Rep. of Germany . | |
| 1348352 | 3/1974 | United Kingdom . | |

*Primary Examiner*—Robert J. Oberleitner
*Assistant Examiner*—Peter M. Poon
*Attorney, Agent, or Firm*—Emch, Schaffer, Schaub

[57] ABSTRACT

The present invention provides for a one-piece band member (10) for use with transmissions. The band member (10) is integrally constructed having the end portions (16) of a strap member (12) being formed an apply member (18) and a reaction member (20) and then folded (22) back over the outer circumference of the strap member (12) to provide a unitary unit. A friction lining (14) is secured around the inner circumference of the strap member (12).

12 Claims, 4 Drawing Sheets

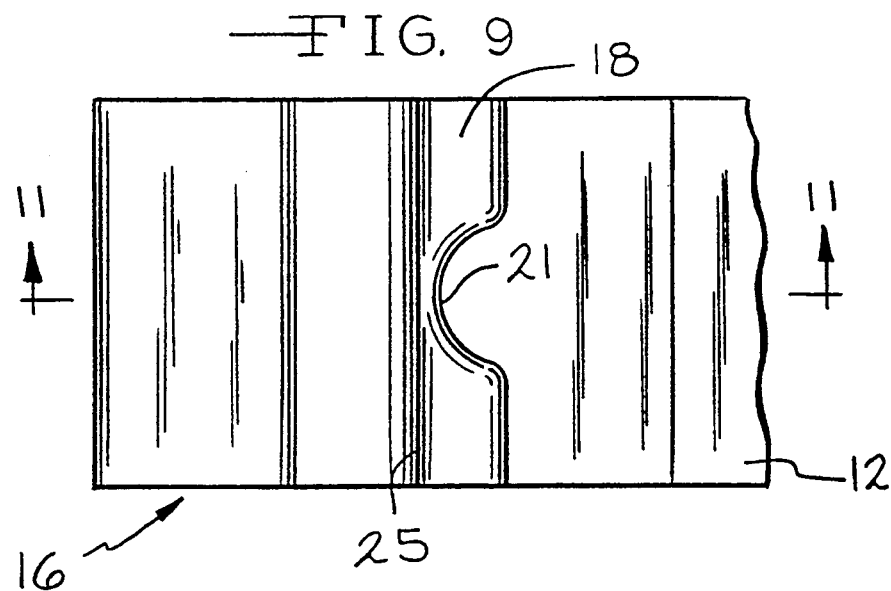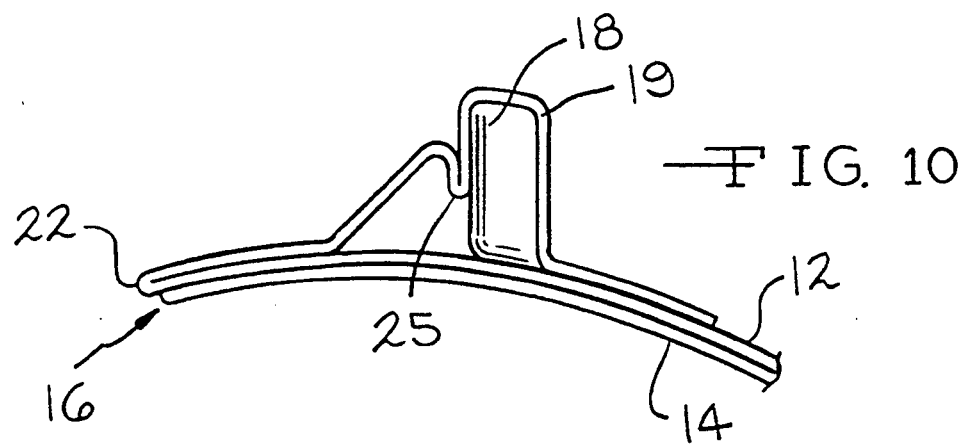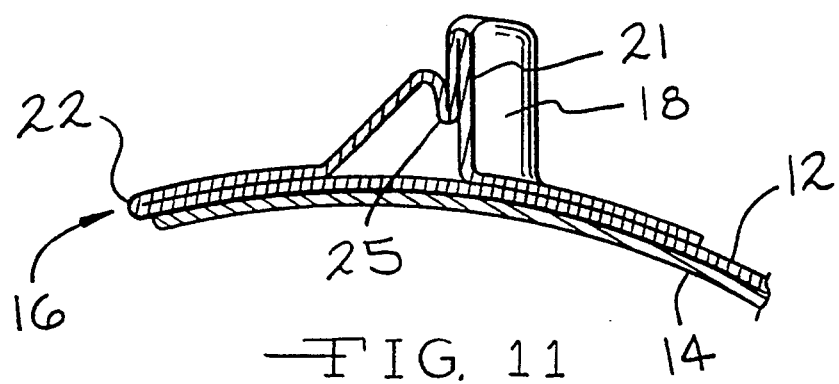

ONE-PIECE TRANSMISSION BAND

This is a continuation of copending application Ser. No. 07/723,429 filed on Jun. 28, 1991 which is a continuation-in-part of Ser. No. 07/508,864, filed Apr. 12, 1990 and 07/546,161 filed Jun. 28, 1990.

TECHNICAL FIELD

The present invention relates to a transmission band intended for use with an automatic transmission assembly and which is disposed to control movement of rotating transmission members. The circumference of the band is flexible and is changed by actuating apply and reaction members integrally formed on the ends of the band.

BACKGROUND ART

Transmission bands are used to act as a brake or clutch to stop a rotating drum member of a transmission. The interior circumference of a transmission band is usually lined with a friction material to assist in achieving the smooth cessation of drum rotation. The ends of a transmission band generally have brackets or lugs known as apply and reaction members which are used to anchor the band member and engage apply pin members located within the transmission, The reaction member is usually anchored and the apply pin engages the apply member to push the apply member toward the reaction member, thereby decreasing the circumference of the band and causing the band to frictionally engage the rotating members or drums within the transmission to brake those members to a stop.

Commonly, prior art transmission bands have been designed to provide endurance under the stressful, repetitive conditions found in the operation of a transmission. Most often these heavy, thick, bands have a thickness or gauge of around 0.080 inches (0.20 cm), allowing the band to enjoy a long life and yet provide some flexibility during application of the band to the rotating transmission drums. However, with the advent of higher fuel costs and automotive manufacturing demands for fuel efficiency, recent research has centered around producing transmission bands of lighter weight materials and thinner cross sections. Development of these lighter weight bands having thinner cross section designs has been plagued by increased problems in the overall quality of the transmission bands and their ability to perform the required repetitive and stressful functions.

A typical single wrap transmission band is formed as a strip of sheet metal having a friction lining adhered about the interior circumference with separate apply and reaction members attached to the ends of the strap members. The apply and reaction members are commonly manufactured as formed brackets which are secured to the strap by an appropriate form of attachment such as a tab lance, extrusion, spot weld, or structural adhesive. The application of these heavy forged apply and reaction members to the lighter, thinner straps is, however, counter-productive to meeting the demands of the automotive manufacturers for lighter weight components. The prior art forged apply and reaction brackets not only have a relatively thick cross section and substantial added weight, they interfere with the potential for enhanced operation characteristics of the transmission band. Transmission bands manufactured from a thinner gauge sheet metal have enhanced operational characteristics when compared to the prior art thicker gauge bands especially in the ability of the band to conform to the rotating drums of the transmission and wear evenly about the band. Bands manufactured with the thick forged apply and reaction brackets, however, do not have the desired flexibility toward the ends of the band where the apply and reaction members are attached and the band, therefore, does not engage, with uniformity, around the rotating transmission pieces. Thus, there is an enhanced possibility of uneven wear of the transmission bands.

Problems have also been encountered with known transmission bands that have been designed to incorporate lighter-weight apply and reaction brackets. A noticeably reduced ability in the load carrying capability of the transmission band commonly results from a premature failure of the band due to stress and fatigue of the lighter-weight apply and reaction members.

Therefore, it is an object of this invention to provide a transmission band which engages the rotating transmission members with greater conformity than current bands.

A further object of this invention is to provide a lightweight, one-piece transmission band having the apply and reaction member integrally formed in the base material.

Yet another object of this invention is to provide a lightweight, one-piece transmission band having load carrying capabilities at least as good if not better that those of the heavier common prior art bands.

DISCLOSURE OF THE INVENTION

The present invention achieves these objectives by providing for a lightweight, one-piece transmission band wherein the apply and reaction members are integrally formed in the strap material. The construction of the one-piece transmission bands of the present invention provides a band having similar and enhanced load carrying capabilities when compared to the heavier prior art band and further enables the transmission band to more uniformly engage the circumference of a transmission member when applied against the rotating transmission member. The apply and reaction members of the present band are formed on the ends of the band where the strap material has been folded 180° flat back over the outer circumference of the strap. The ends of the strap where the apply and reaction members are located are then double in thickness. The folded over end portions are adhered to the strap in an acceptable manner.

The advantages of the present invention and the ability of the present invention to meet the objectives are best understood with reference to the attached drawings and the following detailed description of the best mode for carrying out the invention.

BRIEF DESCRIPTION OF THE DRAWINGS

FIG. 9 is a top view of an alternative embodiment of the apply member of the bands of FIGS. 1, 4, or 6.

FIG. 10 is a side view of the apply member of FIG. 9.

FIG. 11 is a sectional view of the apply member of FIG. 9 taken along line 11—11 of FIG. 9.

BEST MODE OF CARRYING OUT INVENTION

Figure 1:
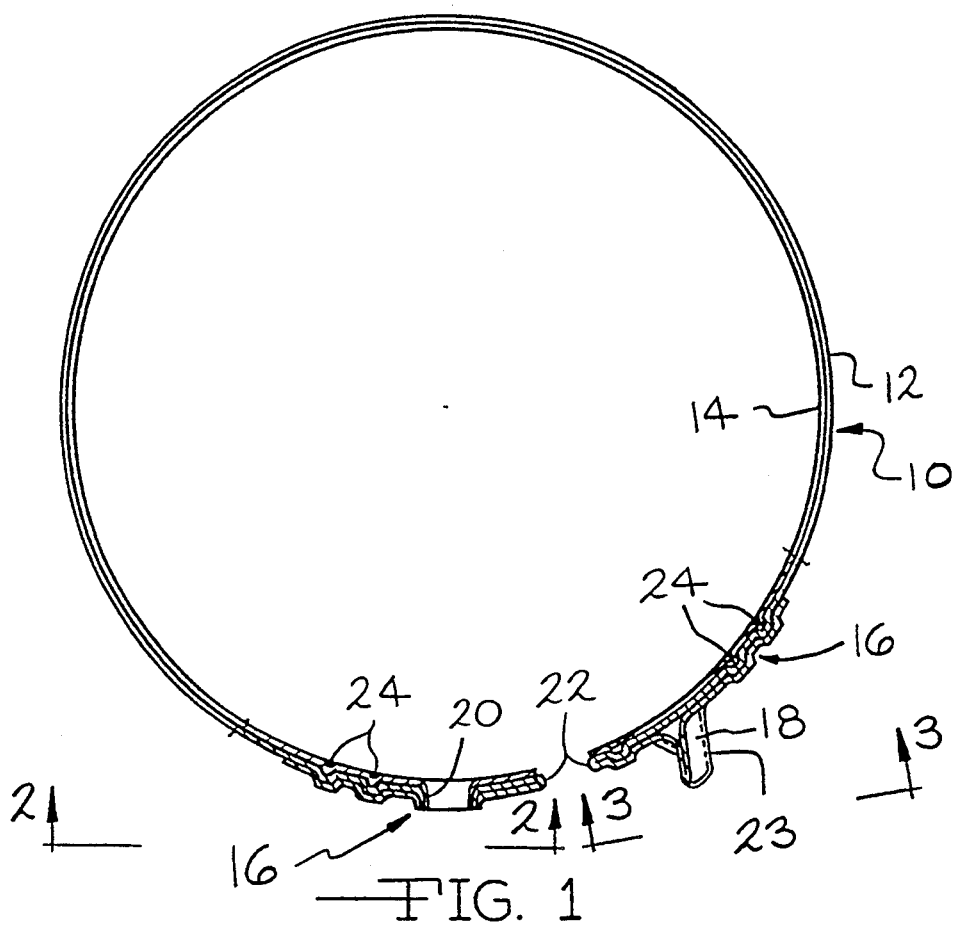
FIG. 1 is a side view of a transmission band of the present invention having a formed apply member and volcano-type reaction member.

Referring now with particularity to the drawings, band assemblies 10 constructed in accordance with the present invention are generally shown. A strap member 12 is formed, usually from an elongated strip of sheet metal, and is arranged in a circular configuration so as to conform with the circular transmission drum (not shown). The sheet metal material from which the strap is formed preferably has a gauge of 0.040 inches (0.10 cm) to 0.050 inches (0.13 cm), approximately one-half the accepted thickness or gauge of standard prior art transmission bands. This dramatic reduction in gauge produces a lightweight band having greatly enhanced friction performance and coastdown characteristics. The strap member 12 includes a friction lining 14 suitably adhered to the inner circumference of the strap member 12. The end portions 16 of the strap member 12 are formed by any suitable process, to be discussed in detail, into the appropriate and desired apply member 18 and reaction member 20.

Figure 2:
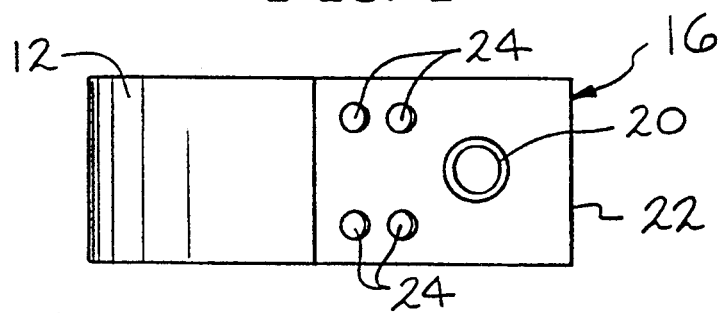
FIG. 2 is a detailed view of the reaction member of the band of FIG. 1 taken along line 2—2 of FIG. 1.
Figure 3:
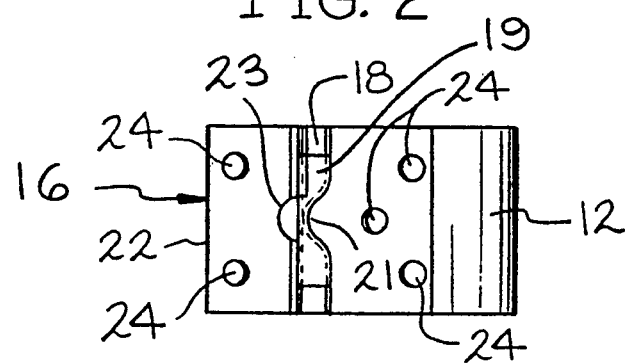
FIG. 3 is a detailed view of the apply member of the band of FIG. 1 taken along line 3—3 of FIG. 1.

Referring now to FIGS. 1-3, a preferred embodiment of the band member 10 is shown. The band member includes a strap member 12 having a friction member 14 adhered to the inner circumference of the strap member 12. The apply member 18, shown in detail in FIG. 3, is formed on the inner circumference of an end portion 16. The apply member 18 is formed with a folded ridge 19 having a pocket 21 for receiving the apply pin. A reinforcing gusset or rib 23 is provided on the opposed or outward side of the pocket 21 to reinforce the contact point for the apply pin. Referring now to FIGS. 9-11, an alternative embodiment of the formed apply bracket 18 is shown. The bracket 18 is generally formed in the same manner as the bracket 18 of FIGS. 1-3. However, a reinforcing fold 25 is formed in the rear or outward side of the pocket 21 and replaces the gusset 23. The reinforcing fold 25 acts to widen the acceptable zone of apply pin placement. After the apply member 18 is formed, the end portion 16 is folded 22 flat 180° back over the outer circumference of the strap member 12 and adhered 24 thereto by any suitable fastening method. The remaining end portion 16 also is folded 22 flat 180° back over the outer circumference of the strap member 12 and adhered 24 thereto. As shown in FIG. 2, the reaction member 20 is formed by puncturing the combined strap member 12 and folded over end portion 16. The reaction member 20 of FIGS. 1-3 is a volcano-type member which is described in detail in co-pending application Ser. No. 07/546,161, filed Jun. 28, 1990, the subject matter of which is incorporated herein in its entirety.

Figure 4:
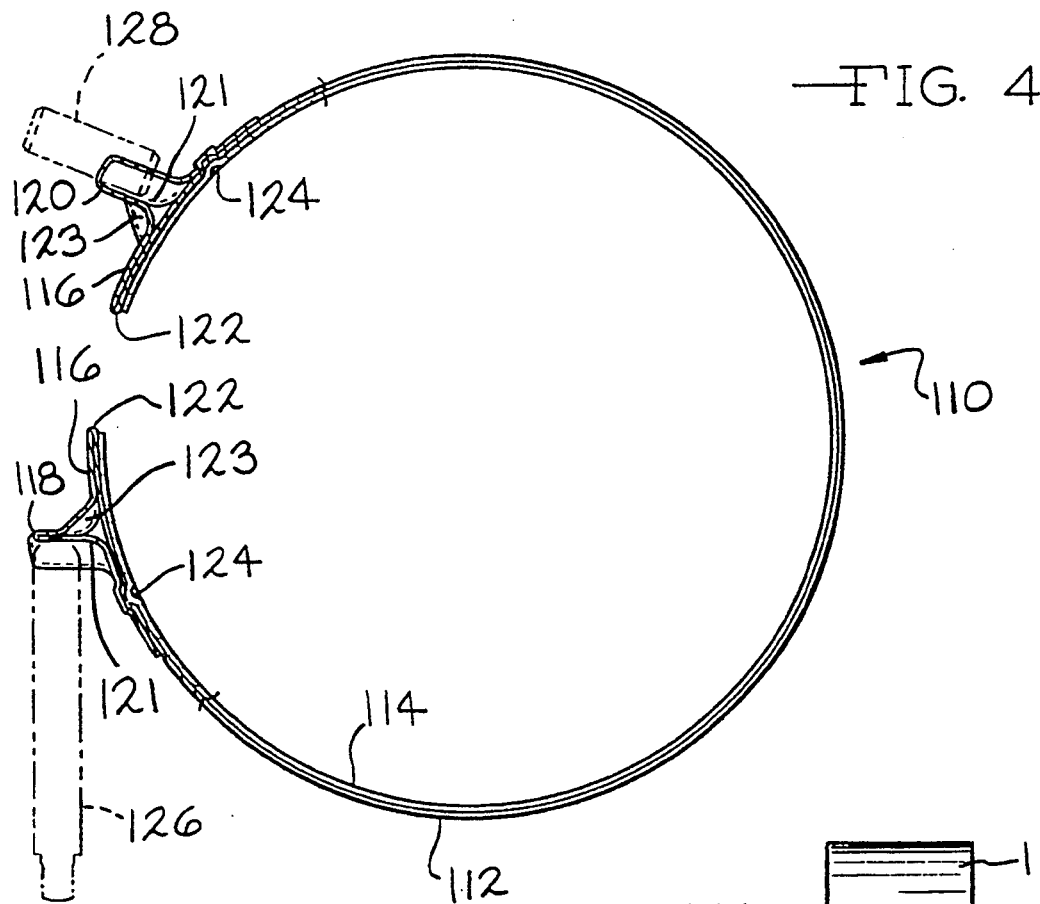
FIG. 4 is a side view of an alternative embodiment of the transmission band of the present invention also showing the apply pin and reaction pin in ghost detail.
Figure 5:
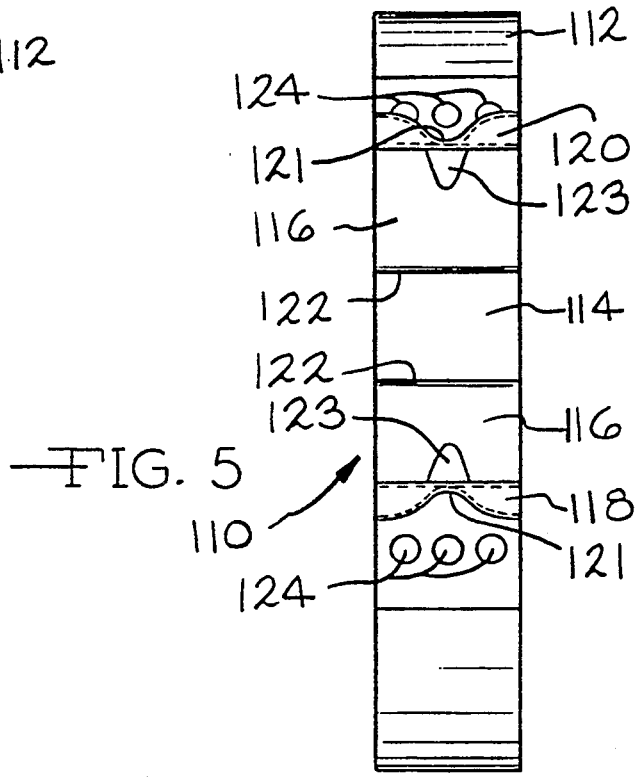
FIG. 5 is a front view of the transmission band of FIG. 4.

Referring now to FIGS. 4 and 5, an alternative embodiment of the band member 110 includes a strap member 112 having a friction lining 114 suitably adhered to its inner circumference. The apply member 118 and the reaction member 120 are formed on the end portions 116 on the inner circumference of the strap member 112. The apply member 118 and reaction members 120 of this embodiment are formed in the same fashion as the apply member 18 of FIGS. 1 and 3. Again, the member 118, 120 may include a reinforcing gusset 123 or, alternatively, a reinforcing fold as previously discussed with regard to FIGS. 1, 3 and 6. After forming the apply member 118 and reaction member 120, the end portions 116 of the strap member are folded 122 flat 180° back over the outer circumference of the strap member 112 so that the apply member 118 and reaction member 120 are located in the outer circumference of the strap member 112 proximate the fold area 122. The folded over end portions 116 are then attached to the strap member by any suitable means of adhesion 124 such as extrusion, tap lance, spot welding or the application of a structural adhesive. Also shown in FIG. 4, in ghost, is the proximate locations for the push pin 126 as it is engaged with the pocket 121 of the apply member 118 and an anchor pin 128 as it is engaged with the pocket 121 of the reaction member 120.

Figure 6:
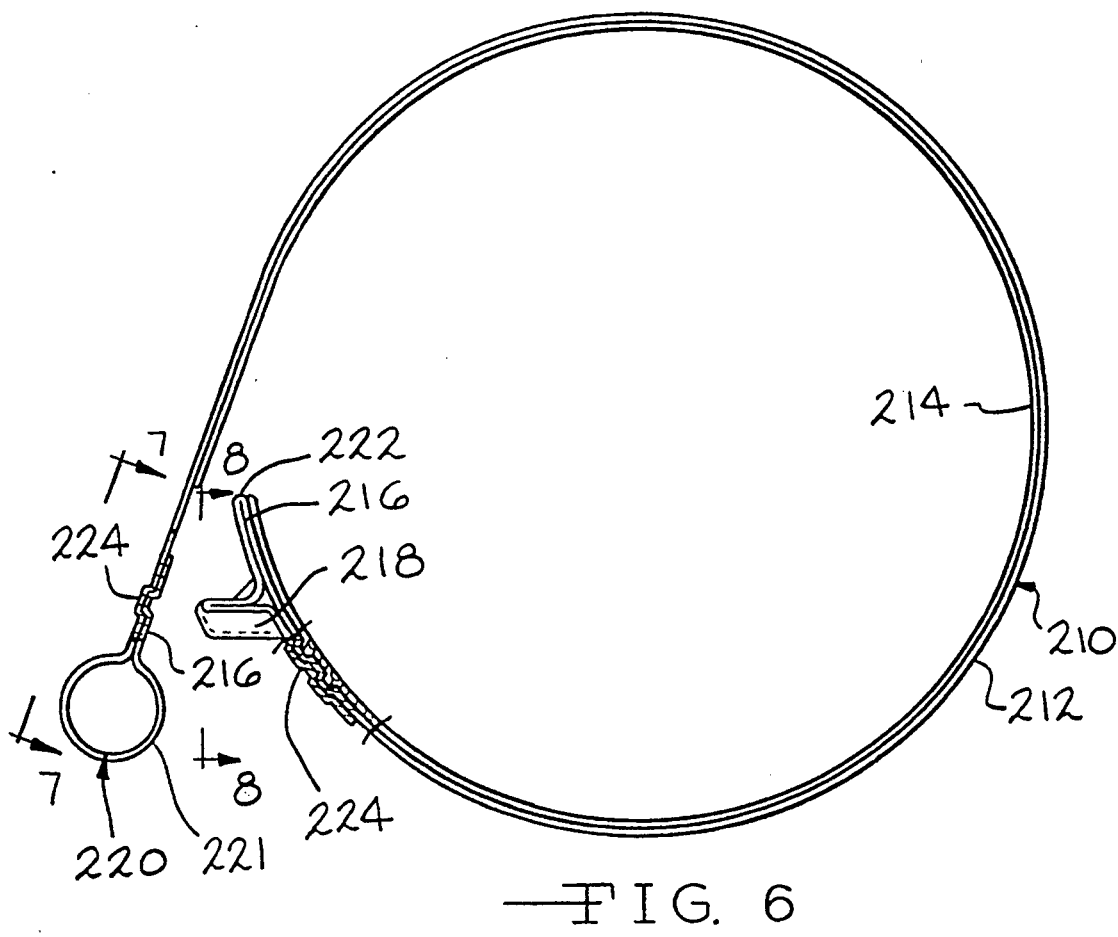
FIG. 6 is a side view of a second alternative embodiment of the transmission band of the present invention.
Figure 7:
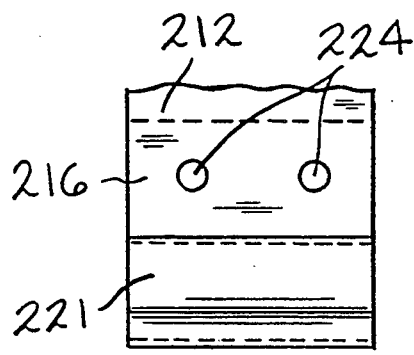
FIG. 7 is a detailed view of the reaction member of the band of FIG. 6 taken along line 7—7 of FIG. 6.
Figure 8:
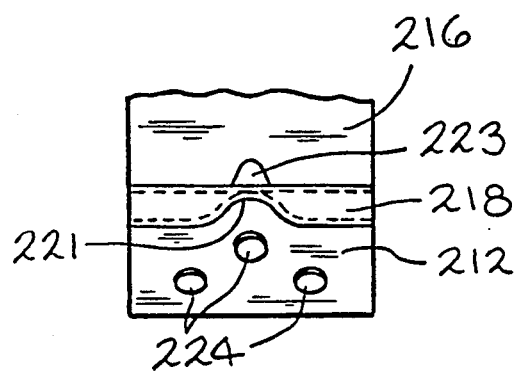
FIG. 8 is a detailed view of the apply member of the band of FIG. 6 taken along line 8—8 of FIG. 6.

Referring now to FIGS. 6-8, yet another alternative of the present invention is shown. The band member 210 includes a strap member 212 having a friction lining 214 suitably adhered to its inner circumference. The apply member 218 is formed on one end 216 of the strap member 212 and folded 222 flat 180° back over the outer circumference of the strap member 212 and adhered 224 thereto as previously discussed with regard to FIGS. 1, 3, 4, 5 and 6. The reaction member 220 is formed as a hoop 221 which is applicable in use where the anticipated loads on the band are not very large or where slot openings in the transmission are specifically designed to accept the hoop to minimize stresses. The end portion 216 of the reaction member 220 is flattened against the strap 212 and again adhered 224 thereto as previously discussed.

The above descriptions of the preferred and alternative embodiments of the present invention are intended to be illustrative and are not intended to be limiting upon the scope and content of the following claims.

We claim:

1. A band member (10) for use in a circumferential friction brake about a rotating member consisting of a strap member (12), having opposed end portions (16), extending in a generally circular configuration to form an inner strap circumference and an outer strap circumference, one of said end portions (16) defining an apply member (18) and a first surface for directly engaging with the outer circumference of said strap member (12) and said opposed end portion (16) defining a reaction member (20) and a second surface for directly engaging with the outer circumference of said strap member (12), wherein said end portions (16) are folded flat (22) back into engagement with the outer strap circumference to form a double directly engaged thickness of such strap material (12) at said fold (22) and at said first and second engaging surfaces, and a friction lining (14) adhered to such inner strap circumference.

2. The band member of claim 1, wherein said apply member (18) includes a ridge (19) formed into said strap member (12), said ridge being upraised from such inner circumference.

3. The band member of claim 2, wherein said ridge (19) includes a pocket (21) formed therein for receiving and guiding an apply pin located in the transmission proximate the apply member (18).

4. The band member of claim 2, wherein said ridge (19) includes a reinforcing gusset (23) integrally formed therewith and located opposite the area of contact by an apply pin located in the transmission proximate the apply member (18).

5. The band member of claim 2, wherein said ridge (19) includes a reinforcing fold (25) of said strap member (12) located in opposition to the area of contact by an apply pin located in the transmission proximate the apply member (18).

6. The band member of claim 2, wherein said ridge (119) includes a reinforcing fold (125) of said strap member (112) located in opposition to the area of contact of an anchor pin located in the transmission proximate the reaction member (120).

7. The band member of claim 1, wherein said strap member (12) is between 0.040 inches and 0.050 inches in thickness.

8. The band member of claim 1, wherein said reaction member (12) includes a ridge (119) formed from said strap member (112), said ridge (119) being upraised from such inner circumference.

9. The band member of claim 8, wherein said ridge (119) includes a pocket (121) formed therein for receiving and guiding an anchor pin located in the transmission proximate the reaction member (120).

10. The band member of claim 8, wherein said ridge (119) includes a reinforcing gusset (123) integrally formed therewith and located opposite the area of contact of the anchor pin located in the transmission proximate the reaction member (120).

11. A band member (10) for use as a circumferential friction brake about a rotating member consisting of a strap member (12) of a determined cross-sectional thickness, having opposed end portions (16), extending in a generally circular configuration to form an inner strap circumference and an outer strap circumference, at least one of said end portions (16) being created by folding a single-thickness portion of such strap member (12) flat (22) back into direct engagement with the outer strap circumference to form a double thickness of said strap member (12), the entire extent of said end portion (16) being inclusive of such directly engaged double thickness of strap material including said fold portion (22); a friction lining (14) disposed about such inner strap circumference; an apply member (18) formed from one of said end portions (16); and a reaction member (20) formed from the remaining end portion (16).

12. A band member (10) for use as a circumferential friction brake about a rotating member consisting of a strap member (12) of a determined cross-sectional thickness, having opposed end portions (16), extending in a generally circular configuration to form an inner strap circumference and an outer strap circumference, one of said end portions (16) defining an apply member (18) and an engagement surface for directly engaging with the outer circumference of said strap member (12), wherein said apply member (18) and said engagement surface are folded flat (22) back into engagement with the outer strap circumference to double said cross-sectional thickness where said engagement surface directly engages said outer strap circumference, the entire extend of said double thickness, including said fold portion (22), being formed from such engagement of said engagement surface with the outer strap circumference, said remaining end portion (16) being configured to be double such cross-sectional thickness by folding (22) a single thickness portion of such strap member (12) flat back into direct engagement with the outer circumference of said strap member, the entire extend of such directly engaged double thickness including said fold portion (22), and having a reaction member (20) formed thereon; and a friction lining (14) disposed about such inner circumference of such strap member (12).

* * * * *